(12) United States Patent
Leonhardt et al.

(10) Patent No.: US 7,564,013 B2
(45) Date of Patent: Jul. 21, 2009

(54) METHOD FOR MATCHING THE POWER OF A PHOTOVOLTAIC SYSTEM TO A WORKING POINT AT WHICH THE SYSTEM PRODUCES MAXIMUM POWER

(75) Inventors: Gerald Leonhardt, Kassel (DE); Christian Kühnel, Kassel (DE); Joachim Ralf Laschinski, Kassel (DE); Sven Bremicker, Alheim (DE); Oliver Arend, Lohfelden (DE); Gerd Bettenwort, Kassel (DE); Wolfgang Kurt Reichenbächer, Staufenberg (DE)

(73) Assignee: SMASolar Technology AG, Niestetal (DE)

( * ) Notice: Subject to any disclaimer, the term of this patent is extended or adjusted under 35 U.S.C. 154(b) by 0 days.

(21) Appl. No.: 12/151,492

(22) Filed: May 7, 2008

(65) Prior Publication Data

US 2008/0290252 A1 Nov. 27, 2008

(30) Foreign Application Priority Data

May 23, 2007 (EP) ................................. 07010197

(51) Int. Cl.
*G01C 21/02* (2006.01)
*G01C 21/24* (2006.01)
*G01J 1/20* (2006.01)

(52) U.S. Cl. .................................. 250/203.4
(58) Field of Classification Search ............... 250/203.4
See application file for complete search history.

(56) References Cited

U.S. PATENT DOCUMENTS

| 5,869,956 | A | 2/1999 | Nagao et al. |
| 6,281,485 | B1 | 8/2001 | Siri |
| 6,528,977 | B2 * | 3/2003 | Arakawa .................... 323/282 |
| 7,087,332 | B2 | 8/2006 | Harris |
| 2005/0068012 | A1 | 3/2005 | Cutler |

FOREIGN PATENT DOCUMENTS

| DE | 4019710 A1 | 6/1990 |
| EP | 1400886 A | 3/2004 |
| JP | 62085312 A | 4/1987 |
| JP | 63036317 A | 2/1988 |

* cited by examiner

*Primary Examiner*—Seung C Sohn
(74) *Attorney, Agent, or Firm*—Thomas R. Vigil

(57) ABSTRACT

A method of matching the power of a photovoltaic system producing electric energy by which a working point at which the system produces maximum power is set by changing the working point in an MPP matching process and by comparing the system power, which changes as a result thereof, is intended to be suited both for stationary characteristic curves and for non stationary generator characteristic curves and to be easy to carry out so that the best working point is always set, even when the system is subjected to external interfering factors. This is achieved in that one or several additional control steps or control cycles are performed in order to track during the matching process a power point changing under external impact for a working point of even higher power to be set.

12 Claims, 3 Drawing Sheets

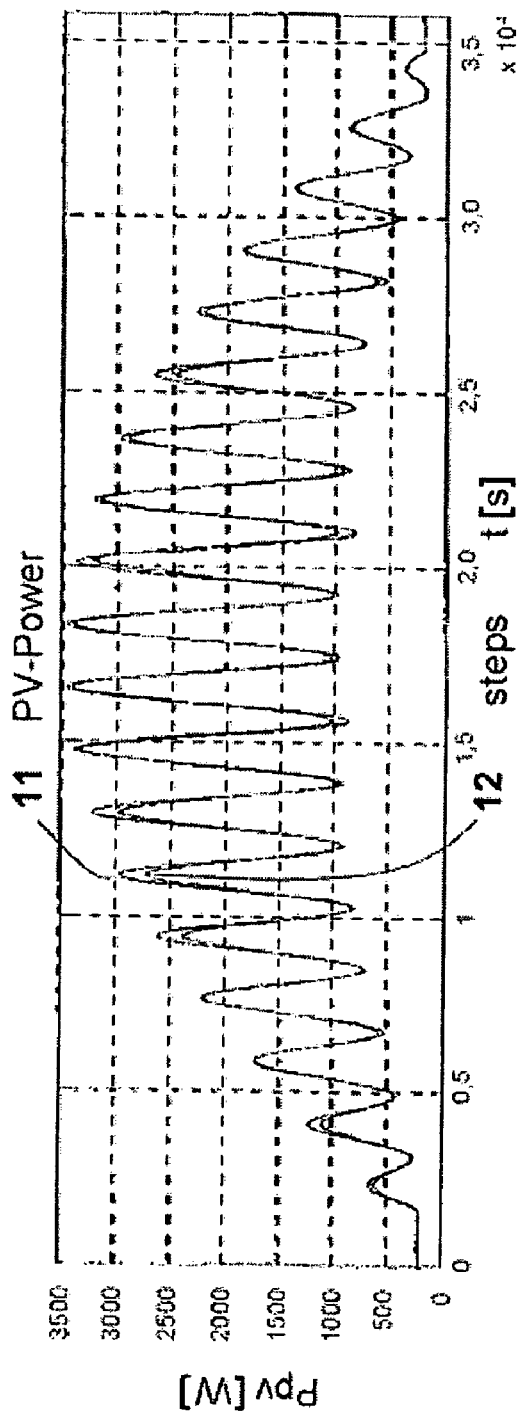
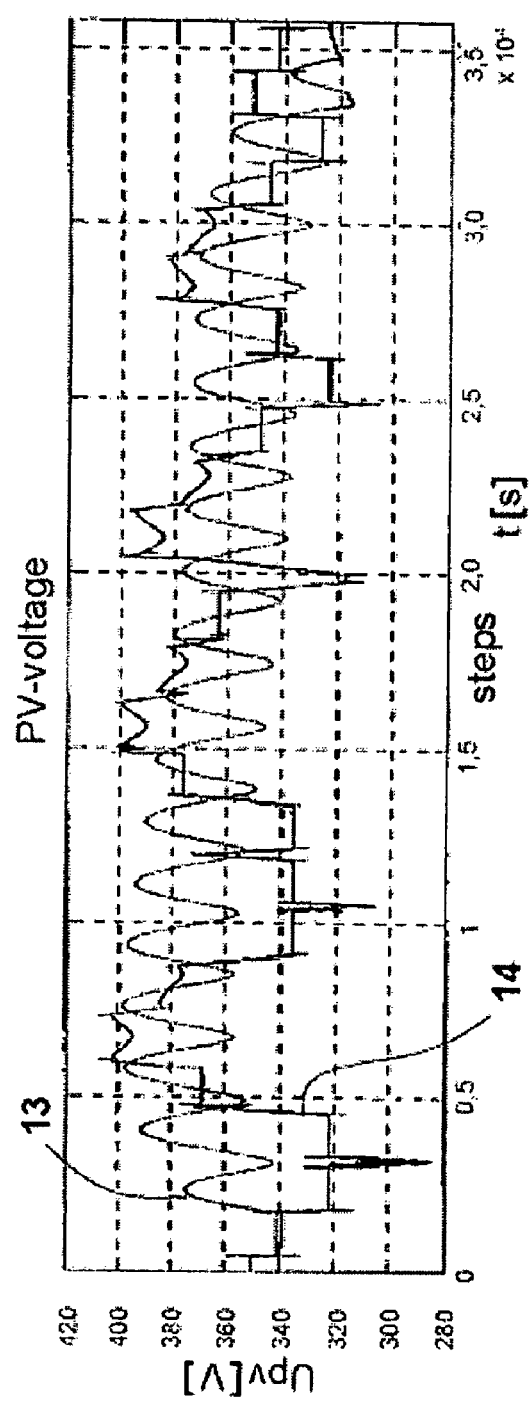
Fig. 2
Fig. 3

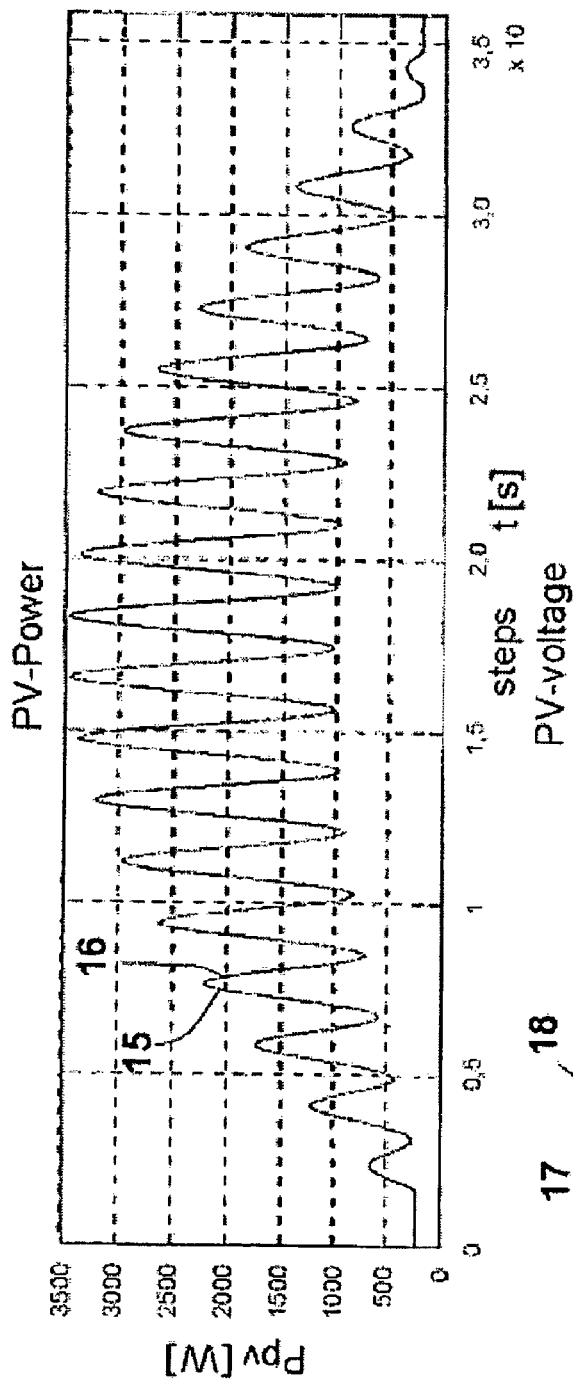

METHOD FOR MATCHING THE POWER OF A PHOTOVOLTAIC SYSTEM TO A WORKING POINT AT WHICH THE SYSTEM PRODUCES MAXIMUM POWER

CROSS-REFERENCE TO RELATED APPLICATIONS

This application claims Priority from European Application No. EP 07010197.7 filed May 23, 2007.

FIELD OF THE INVENTION

The invention relates to a method for matching the power of a system producing electric energy by which a working point at which the system produces maximum power is set by changing the working point in an MPP matching process and by comparing the system power, which changes as a result thereof.

Photovoltaic generators consist of photovoltaic cells or of what are referred to as solar cells which, by virtue of their semi-conductor properties, comprise particular generator characteristic curves. The peak power that may be delivered depends heavily on the working point of the generator characteristic curve. Since precious and expensive electric energy gets lost if wrongly matched, one tries to optimally is match the working point using matching methods. For, the working point depends not only on the electric load but also on the sun's radiation striking the generator surface, which is not constant.

DESCRIPTION OF THE PRIOR ART

A method to optimizing the power of the type mentioned is known from U.S. Pat. No. 6,281,485 for example. An inverter is thereby triggered to activate a matching cycle so that a maximum amount of electric power is obtained. For setting the working point, current and voltage are monitored while being subjected to electrical loading.

In practice however, the problem is that the edge conditions may change quite quickly through varying meteorological impact. The method mentioned may not be able to sufficiently quickly detect the interfering factors so that the working point set may be less optimal.

If the edge conditions are never stationary, mismatches or even the setting of the idle or short-circuit point are possible so that the power flow collapses completely.

Another method of controlling a matching device interposed between an alternative power source and a load is shown and described in DE 40 19 710 A1. Through a current-voltage measurement, the actual power delivered by a power source is detected and fixed as the output power. Next, the actual power provided by the energy source is detected with a dictated voltage value of increased output voltage of the energy source and is compared to the previously fixed output power. This is repeated with output voltages increased gradually by imposed voltage values until one of the actual powers respectively detected is higher than the previously fixed output power. If the actual power obtained is higher than the output power previously detected, the first fixed output voltage of the energy source is changed by the imposed voltage values, the number of the voltage values is reduced to 1 and the output voltage of the energy source is held at the maximum power point.

This method operates reliably only when the generator characteristic curve is stationary. If the generator characteristic curve is not stationary, for example due to quickly changing meteorological conditions, this method does not find the maximum power point.

BRIEF SUMMARY OF THE DESCRIPTION

It is the object of the invention to indicate a method that is suited for both stationary generator characteristic curves and non stationary generator characteristic curves and that is easy to perform so that the best working point is set even if there are external interfering factors.

The solution to this object is achieved in that at least one additional control step or control cycle is performed for detecting an external meteorological impact on a photovoltaic generator that causes a sudden in sun irradiation, and that the at least one control step or the at least one control cycle is integrated in the MPP matching process, it being checked in at least one control step or in at least one control cycle whether the generator characteristic curve has changed under the meteorological impact during one MPP matching cycle and a new working point being set in at least one correction step or in at least one correction cycle as a function of the change in position of one reference point so that during the MPP matching process the power point changed under the impact of external meteorological conditions is tracked so as to set a working point at which the system produces more power.

Further advantageous embodiments of the invention will become apparent from the dependent claims.

The invention relies on the idea to check through one or several additional control steps or control cycles whether an assumed maximum power point indeed corresponds to the actual maximum power point. The control steps, which are virtually integrated in the matching process, allow for a very fast correction of the working point if the generator characteristic has changed under external impact during a matching cycle.

The sun's radiation striking the photovoltaic generator may for example be suddenly strongly reduced by cloud cover so that at the beginning of a matching cycle a first generator characteristic curve with a high short-circuit current and at the end of the matching cycle a generator characteristic curve with a lower short-circuit current is obtained. If the radiation undergoes great changes, the idle voltage behaves analogous to the short-circuit current.

The invention allows for readily taking into consideration varying impacts during tracking. Through additional control and additional correction, an unexpected high efficiency can be achieved. Accordingly, even under meteorological impact, the efficiency can be increased quite readily and at low cost from about 96% to 99.6% with conventional tracking under certain conditions. This means that the invention allows for converting 99.6% of the energy supply.

The invention allows for the energy converting system to adjust itself in its optimal operation point or range, one or several control steps or control cycles being performed at one or several reference points or for one or several reference portions. One new or several new working points or one new working portion is set as a function of the change in the position of the reference point or of the reference points or of the reference range.

The method of the invention allows for interference-resistant operation of an energy converting system in its best operating point or operating range. The influence of external impact onto a reference working point is acquired via its time behaviour, the operating point of the system being tracked accordingly.

When the characteristic curve is non stationary, the reference point or the reference points or the reference range are tracked in cyclical or acyclic intervals to meet the new working point or the new working points or the new working portion.

Accordingly, the invention provides a method for an energy converting system to adjust itself to its best operation point or operation range. A self-adaptive method of an energy converting system serves to perform the function of ensuring operation in the best operating point irrespective of external disturbance variables, meaning durably. As a result, it is capable of increasing the energy output of the source as compared to other methods of working point setting, e.g., as compared to a fixed point operation of the system.

The method of the invention reliably finds the maximum power point with a stationary and a non stationary characteristic curve, which is not the case with the methods known in prior art.

The invention not only allows for setting the best working point but also to keep it. In addition thereto, the invention also allows keeping the maximum power point if the characteristic curve is permanently non stationary. Methods known from prior art are only capable of reacting to characteristic curves that vary occasionally; they cannot react to permanently non stationary characteristic curves. The method finds the maximum power point even at low performance whether the characteristics is stationary or non stationary. In the case of lower performance in particular, other known methods operate with very little accuracy.

In one of the preferred embodiments of the invention, there is more specifically provided that the matching process is delayed by one or several search steps also in the sense of a matching cycle, one or several of the control steps or of the control cycles being performed during the delay so that the working point is corrected pursuant to the direction of the change in power induced by external impact or is maintained if no power change occurs. Delaying the search step or the search steps by one, two or multiple time intervals serves to repeatedly monitor the power. If the power difference between the first and the last monitoring operation is sufficiently small, the edge conditions are assumed to be constant and the search step is performed in the predetermined direction. If however a significant power change is observed, the search step is either corrected pursuant to the direction of the change in power or maintained. As a result, the operation point is kept as close as possible to its best point in time average.

In an advantageous developed implementation of the method of the invention, there is provided that the matching process is interrupted in order to set one or several past working points during one or several control steps or control cycles in such a manner that a past working point is set as a reference point, said working point being set in the direction of the power change during a control step or control cycle so that it is corrected or not corrected when no power change is noticed. Self-matching can be performed using a basic method. The interruption allows returning to one or several discretionary points that are provided as one reference point or as reference points. In cyclical, or in acyclic intervals as well, the basic method is interrupted and one or several past working points or one reference point or reference points are set. If the reference point or the reference points has unchanged characteristic values, the edge conditions are assumed to be constant and the search step is performed in the predetermined direction. If however a significant change in power has been noticed, the search step is either corrected pursuant to the direction of the power change or it is maintained. As a result, the operating point is kept close to its maximum point in time average as far as practicable.

According to another advantageous embodiment of the invention, two left-side reference points are set during a control step or control cycle, said reference points being closer to a short-circuit point than a previously left actual working point. These reference points form a portion on the current-voltage characteristic curve and are characterized by almost identical currents.

In order to be capable of performing a control step or a control cycle, there is provided, appropriately, that it is changed by electrically loading or unloading the system.

It is advantageous that, in the matching process as self-adaptation, the working point is compulsorily displaced by electrically loading or unloading a current generating generator, matching being based on a comparative result of two or several consecutive working points. The measured values can be stored in a digital memory and be compared by running a program, the best value being always recorded in the memory.

In a basic method, the process of self-adaptation can be performed using a slope method, which is particularly favorable. The object of such a method is to find out whether the working point is located on the downward portion of the curve or one the upward portion. For this purpose, the difference quotients between power and voltage are formed from two successive measurements and the search direction and search width are fixed with the right sign. A correction using the additional correction method can be easily integrated into the basic method.

It is also advantageous if the adaptation process is performed in a basic method, using a predictor correction method. The additional correction steps are also easy to perform. In principle, any known basic method can be utilized.

In principle, the method of the invention is suited for any type of generator having a pronounced peak between short-circuit and idle point. Application thereof to systems having a photovoltaic generator is particularly advantageous because of its particular current-voltage characteristic.

It is also appropriate to perform the method with the help of an inverter that may be displaced about the working point on the generator characteristic curve by simple loading and unloading.

The invention will be explained in closer detail herein after with reference to an exemplary embodiment, further advantageous developed implementations of the invention and advantages thereof being described.

BRIEF DESCRIPTION OF THE DRAWINGS

FIG. 2 shows a comparison between a power curve with enforced vibrations with interfering factors and one power curve without external impact;

FIG. 3 shows a comparison between two voltage curves, one curve showing the ideal voltage and the other one the actual voltage;

FIG. 4 shows a curve showing the power when an energy converting system is able of delivering the maximum power and a curve in the case the invention is used for comparison; and FIG. 5 shows a curve showing the voltage when a prior art energy converting system is able to deliver the maximum power and a voltage curve in the case the invention is used for comparison.

DETAILED DESCRIPTION OF THE INVENTION

Figure 1:
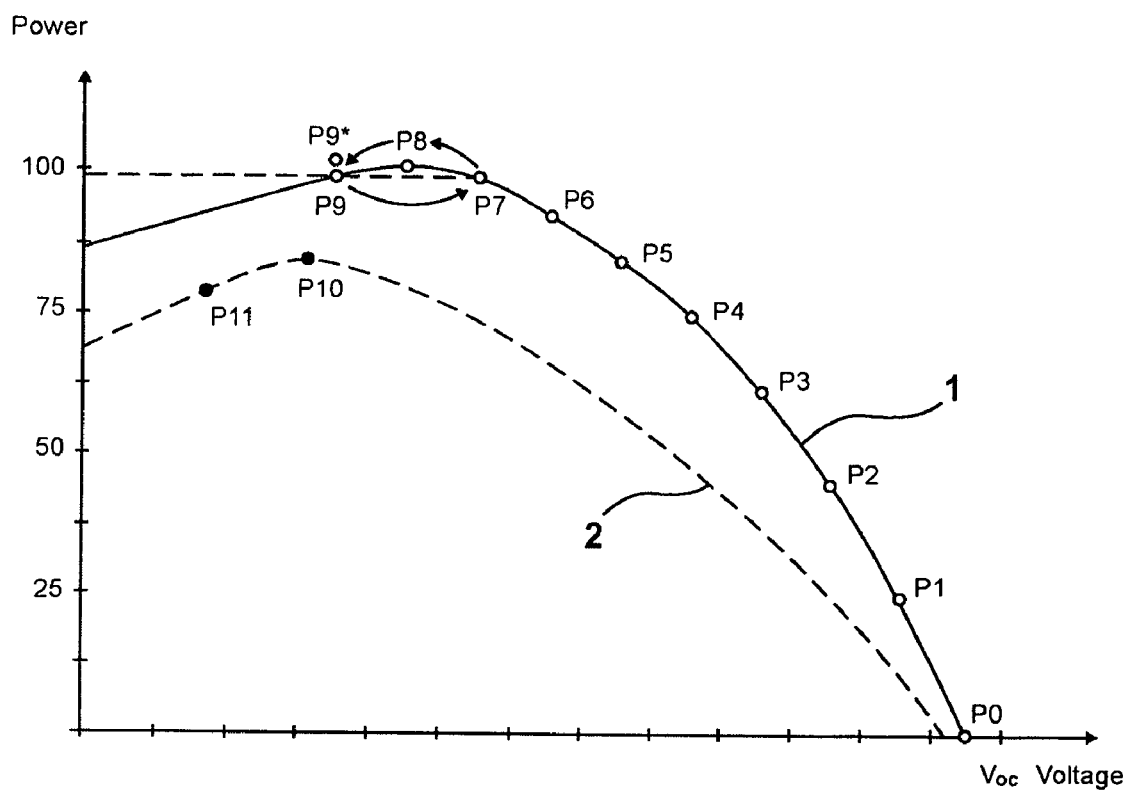
FIG. 1 shows a characteristic curve showing two power curves of different sun irradiation.

FIG. 1 shows a first generator characteristic curve 1 of a photovoltaic system with a photovoltaic inverter and with a DC-AC photovoltaic inverter for electrical energy production. For setting the best working point, a basic method implemented as a slope method is being utilized.

The slope method, which is being utilized as a basic method, will first be described to garner a better understanding. At first, it is assumed that the generator operates under stationary conditions or that the radiation striking the generator is constant while the working point is being set. At first, the generator is not yet in operation so that the voltage applied at the input is an idle voltage $V_{oc}$, the working point being indicated at $P_0$.

The power begins to be delivered with a target value, e.g., a voltage target value, being dictated that is smaller than the idle voltage $V_{oc}$. Successively, the target value is gradually lowered so that the generator power increases as a result thereof. The working points P1 through P7 are set hereby.

In this way, the working point migrates along the downward portion with a negative slope until reaching the working point P8. P8 constitutes the working point of maximum generator power.

If the working point is further displaced or if the target value increases, the generator power drops. The working point P9*, which would contain the same power than P8, is not possible. The point P9 forcibly settles on the upward portion with a positive slope, said point P9 delivering a lower generator power. Since the generator power is smaller in the point P9 than in the point P8, the working point must be displaced in the direction of the downward portion of the generator's characteristic curve 1. Accordingly, the target value is increased step by step until point P7 is achieved on the characteristic curve, so that the target value may begin to be reduced again. In this way, a boundary cycle establishes about the best point.

During adaptation, the sun's radiation onto the generator may change. The power may drop for example. In this case, another generator characteristic curve 2 is set. Another voltage is associated with the best working point P10 of the characteristic curve 2 though. It may happen that without the invention a working point P11 is for example set that comprises a significantly lower performance than the maximum value P10.

In accordance with the invention, one or several additional control steps or control cycles are performed to track during the matching cycle a power point that changes under external impact so that a higher performance working point is set.

If the characteristic curve changes from characteristic curve 1 to characteristic curve 2 while the basic method is being performed, the working point P10 can be set through the additional correction.

In a variant of the invention, two consecutive values of the measured module performance are compared during correction of the interfering factors, just like with a prediction correction based method.

The curve shown in FIG. 2 and indicated at 11 shows the maximum power an energy converting system is capable of delivering, said system being intended to make it possible to deliver the greatest possible power using a characteristic curve method as the basic method.

Using the characteristic curve method, the system is forced to produce oscillations, the generator power to be optimized varying about its extreme value without serving itself as a control variable. Accordingly, the present case dispenses with the need for calculating the product of the generator voltage with the current and one achieves instead an optimization of the generator power by only knowing the generator variables current and voltage. For this purpose, the voltage is reduced gradually until the measured voltage is smaller than k times a value previously measured and stored. As soon as this is the case, the generator current is measured and stored. Now, the generator voltage is reduced until the generator current is smaller than k times the value stored before. This procedure is repeated alternately and, as a result, the system levels off about the best point, the parameter k having to range between 0 and 1.

The power curve, which is indicated at 12 in FIG. 2 and forms without correction steps, is often below the indicated curve 11, i.e., below a possible optimized value. Through the lower power, the system is virtually lossy. The reason therefore is that the system is not capable of tracking an ideal voltage, which is indicated at 13 in FIG. 3, without performing additional correction steps. The actually set voltage is indicated at 14. All basic methods have in common that they can only ensure an optimum energy efficiency if the conditions are stationary.

Correction steps, performed for example during an interruption of the basic method, allow for tracking the voltage so that maximum power is possible.

The curve indicated at 15 in FIG. 4 shows a power curve at maximum power of an energy converting system. The power curve indicated at 16 constitutes the power curve using correction steps and coincides almost with the curve 15. As a result, the system is hardly lossy. This system may realize about 99.6% of the energy supply.

FIG. 5 shows the voltage curves corresponding to FIG. 4. The system can track the ideal voltage, which is indicated at 17, with a good approximation. The actually set voltage is indicated at 18.

Several preferred variants are explained for performing the correction steps.

One variant consists in delaying one or several search steps by double or multiple time intervals so as to allow for watching the performance several times. If the power difference between the first performance watched and the last one is small enough, the edge conditions are assumed to be constant and the search step is performed in the predetermined direction. If however a significant change in power is observed, the search step is either corrected according to the direction of the change in power or it is maintained.

As a result, the operation point is kept as close as possible to its best point in time average.

In principle, a prediction correction based method can be utilized as the basic method in addition to a slope method or to a characteristic curve method.

The basic functioning of this method is based on comparing the various working points of the generator power after a forced displacement of the working point by loading or unloading the generator. Depending on the result of the comparison of two consecutive power measurements, a new search step is performed. For this purpose, a new working point is set in the intention to achieve a power increase. If the power cannot be increased, the previous search step is corrected and the working point is displaced in the opposite direction.

In a second variant, one or several discretional points are returned to once or several times, these points being the reference point or reference points. In cyclic or a cyclical intervals, the basic method is interrupted and one or several past working points are set as the reference points. If the reference point or points has or have still the same characteristic values, the edge conditions are assumed to be constant, the search step being performed in the predetermined direction. If however a significant change in power is observed, the search step is either amended pursuant to the direction of the change in power or it is maintained. As a result, the operation point is kept as close as possible to its best point.

Another variant is characterized by the fact that two left reference points are set. This means that the two reference points are closer to the short-circuit point than the actual working point left before. These reference points form a portion on the current-voltage characteristic curve and are characterized by almost the same currents.

We claim:

1. A method of matching the power of a photovoltaic system producing electric energy by which a working point at which the system produces maximum power is set by changing the working point in an MPP matching process and by comparing the system power, which changes as a result thereof, characterized in that at least one additional control step or control cycle is performed for detecting an external meteorological impact on a photovoltaic generator that causes a sudden strong reduction in sun irradiation, whereby the control step or control cycle is performed so that a past working point is set as reference working point to check through one additional control step or control cycle whether an assumed maximum power point indeed corresponds to the actual maximum power point, so that it can be checked if a non stationary characteristic curve exists, and that said at least one control step or said at least one control cycle is integrated in said MPP matching process, it being checked in at least one control step or in at least one control cycle whether the generator characteristic curve has changed under the meteorological impact during one MPP matching cycle and a new working point being set in at least one correction step or in at least one correction cycle as a function of the change in position of one reference point so that during the MPP matching process the power point changed under the impact of external meteorological conditions is tracked so as to set a working point at which the system produces more power.

2. The method as set forth in claim 1, characterized in that the one or several additional control portions or control cycles are performed at one or several reference points or reference portions.

3. The method as set forth in claim 1, characterized in that the reference point or the reference points are tracked in cyclical or acyclical intervals to meet the new working point or the new working points or the new working portion.

4. The method as set forth in claim 1, characterized in that the matching process is delayed by one or several search steps, one or several of the control steps or of the control cycles being performed during the delay so that the working point is corrected pursuant to the direction of a change in power induced by an external impact or is maintained if no power change occurs.

5. The method as set forth in claim 1, characterized by an interruption in the matching process in order to set one or several past working points during one or several control steps or control cycles for a past working point to be set as the reference point, said working point being set pursuant to the direction of the change in power during a control step or control cycle when the power changes.

6. The method as set forth in claim 1, characterized in that two left-side reference points are set during one control step or control cycle, said reference points being closer to a short-circuit point than a previously left actual working point.

7. The method as set forth in claim 1, characterized in that a control step or a control cycle is respectively performed by electrically loading or unloading the system for a reference point to change.

8. The method as set forth in claim 1, characterized in that, in the matching process, the working point is compulsorily displaced by electrically loading or unloading a current generating generator, matching being dependent on a comparative result of two or several consecutive working points.

9. The method as set forth in claim 1. characterized in that the matching process is performed in a method based on a slope method, the difference quotients between power and voltage being formed from two successive measurements and the sign direction, the search direction and the search width being fixed.

10. The method as set forth in claim 1, characterized in that the system includes a photovoltaic generator.

11. The method as set forth in claim 1, characterized in that it is carried out by means of an inverter.

12. The method as set forth in claim 1, characterized in that the inverter is a photovoltaic inverter.

* * * * *